(12) United States Patent
List et al.

(10) Patent No.: US 10,710,032 B1
(45) Date of Patent: Jul. 14, 2020

(54) UNIVERSAL BRIDGE AND WALL MOUNTED AERATION APPARATUS

(71) Applicant: Aeration Industries International, LLC, Chaska, MN (US)

(72) Inventors: Randy W. List, Lakeville, MN (US); Jing Huang, Chaska, MN (US); Joseph F. Widman, Chaska, MN (US); Brian J. Cohen, Chanhassen, MN (US); Todd M. Schroeder, Eden Prairie, MN (US); Gregory R. Harding, Minneapolis, MN (US); Paul P. Gorbunow, Minneapolis, MN (US); Jason L. Jones, Waconia, MN (US); Steven R. Carleton, Minnetonka, MN (US)

(73) Assignee: Aeration Industries International, LLC, Chaska, MN (US)

( * ) Notice: Subject to any disclaimer, the term of this patent is extended or adjusted under 35 U.S.C. 154(b) by 323 days.

(21) Appl. No.: 15/621,830

(22) Filed: Jun. 13, 2017

Related U.S. Application Data

(62) Division of application No. 14/515,473, filed on Oct. 15, 2014, now Pat. No. 9,675,942.

(Continued)

(51) Int. Cl.
*B01F 3/04* (2006.01)
*B01F 7/00* (2006.01)
(Continued)

(52) U.S. Cl.
CPC ...... *B01F 3/04531* (2013.01); *B01F 7/00008* (2013.01); *B01F 7/00741* (2013.01);
(Continued)

(58) Field of Classification Search
CPC ................. F16M 13/025; F16M 11/00; F16M 2200/025; F16M 2200/06; F16M 13/00;
(Continued)

(56) References Cited

U.S. PATENT DOCUMENTS

| 2,997,284 | A | * | 8/1961 | Nechine | ................. | C02F 3/203 |
| | | | | | | 261/122.1 |
| 3,116,021 | A | * | 12/1963 | Born | ................. | F16L 27/0857 |
| | | | | | | 239/588 |

(Continued)

*Primary Examiner* — Stephen Hobson
(74) *Attorney, Agent, or Firm* — Albert W. Watkins

(57) ABSTRACT

A universal wall and bridge mounted aeration apparatus has a track extending between two distinct elevations that is coupled to a wall and bridge mount. An aeration unit is pivotally coupled to the track and has an aerator adapted to operatively at least partially submerge within and aerate a liquid. A selective mover or drive is adapted to operatively move the aeration unit along the track and thereby vary an elevation of the aeration unit. The universal wall and bridge mount supports the track and aeration unit. The universal wall and bridge mount has a first configuration for mounting to a structure such as a stationary bridge, and a second configuration for mounting to a wall. The universal wall and bridge mounted aeration apparatus may be adjusted to position the propeller after installation under the surface of the liquid through three axes of motion freedom.

14 Claims, 7 Drawing Sheets

Related U.S. Application Data

(60) Provisional application No. 61/891,384, filed on Oct. 15, 2013.

(51) Int. Cl.

| | |
|---|---|
| *F16B 1/00* | (2006.01) |
| *F16B 9/02* | (2006.01) |
| *C02F 3/12* | (2006.01) |
| *F16B 9/00* | (2006.01) |
| *F16M 13/00* | (2006.01) |
| *B63H 20/10* | (2006.01) |
| *F16M 11/00* | (2006.01) |

(52) U.S. Cl.
CPC .......... *B63H 20/106* (2013.01); *C02F 3/1284* (2013.01); *F16B 1/00* (2013.01); *F16B 9/00* (2013.01); *F16B 9/02* (2013.01); *F16M 11/00* (2013.01); *F16M 13/00* (2013.01); *F16M 2200/02* (2013.01); *F16M 2200/021* (2013.01); *F16M 2200/025* (2013.01); *F16M 2200/06* (2013.01); *Y02W 10/15* (2015.05); *Y10T 403/00* (2015.01)

(58) Field of Classification Search
CPC ........ F16M 2200/021; F16M 2200/02; Y02W 10/15; B01F 3/04531; B01F 7/00008; B01F 7/00741; F16B 9/00; F16B 9/02; F16B 1/00; B63H 20/106; Y10T 403/00; C02F 3/1284

See application file for complete search history.

(56) References Cited

U.S. PATENT DOCUMENTS

| | | | | |
|---|---|---|---|---|
| 3,164,353 | A * | 1/1965 | Rene | E04G 3/26 248/237 |
| 3,339,901 | A * | 9/1967 | Walker | C02F 3/203 261/124 |
| 3,614,072 | A * | 10/1971 | Brodie | B01F 3/04595 261/36.1 |
| 3,738,628 | A * | 6/1973 | Nechine | C02F 3/20 261/122.1 |
| 3,785,629 | A * | 1/1974 | McKinney | C02F 3/20 261/122.1 |
| 3,881,443 | A * | 5/1975 | Hamp | B63H 20/007 440/1 |
| 4,273,732 | A * | 6/1981 | Roediger | C02F 3/203 210/220 |
| 4,358,298 | A * | 11/1982 | Ratcliff | E21B 21/067 366/137 |
| 4,409,100 | A * | 10/1983 | Rajendren | A01K 63/042 210/219 |
| 4,431,597 | A * | 2/1984 | Cramer | B01F 7/00741 261/93 |
| 4,464,259 | A * | 8/1984 | Cramer | B01F 7/00741 210/170.08 |
| 4,519,714 | A * | 5/1985 | Johnson | B01F 7/00733 366/279 |
| 4,563,155 | A * | 1/1986 | Blanchard | B63H 25/42 114/162 |
| 4,581,182 | A * | 4/1986 | Cramer | B01F 7/00741 210/220 |
| 4,587,064 | A * | 5/1986 | Blum | B63B 35/00 210/242.2 |
| 4,618,426 | A * | 10/1986 | Mandt | B01F 7/00741 210/220 |
| 4,671,872 | A * | 6/1987 | Cramer | B01F 7/00741 210/219 |
| 4,710,325 | A * | 12/1987 | Cramer | B01F 3/04609 210/219 |
| 4,732,682 | A * | 3/1988 | Rymal | B01F 3/04539 210/620 |
| 4,842,559 | A * | 6/1989 | Litjens | B63H 21/265 440/1 |
| 4,844,843 | A * | 7/1989 | Rajendren | B01F 3/04539 261/30 |
| 4,954,295 | A * | 9/1990 | Durda | B01F 3/04539 261/16 |
| 5,145,254 | A * | 9/1992 | Hovstadius | B01F 7/00733 366/286 |
| 5,221,009 | A * | 6/1993 | Ritzenthaler | B62H 3/12 211/18 |
| 5,282,681 | A * | 2/1994 | Supelak | B01F 7/00733 366/244 |
| 5,300,261 | A * | 4/1994 | Von Berg | B01F 3/04539 261/87 |
| 5,382,183 | A * | 1/1995 | Rompre | B63H 20/10 248/641 |
| 5,421,383 | A * | 6/1995 | Schmid | B01F 3/0412 137/592 |
| 5,568,975 | A * | 10/1996 | Blakley | B01F 7/22 366/285 |
| 5,744,072 | A * | 4/1998 | Karliner | B01F 3/04765 114/352 |
| 5,868,091 | A * | 2/1999 | Gross | B63B 1/121 114/61.1 |
| 6,022,476 | A * | 2/2000 | Hausin | B01F 3/0412 210/150 |
| 6,126,361 | A * | 10/2000 | Gardiner | B01F 3/04595 210/198.1 |
| 6,231,766 | B1 * | 5/2001 | Hausin | B01F 3/0412 210/150 |
| 6,390,864 | B1 * | 5/2002 | Jenkins | B63H 20/06 248/640 |
| 6,652,335 | B1 * | 11/2003 | Peschmann | B63H 20/06 248/642 |
| 6,964,511 | B2 * | 11/2005 | Rumph | B01F 3/1221 366/261 |
| 7,159,262 | B2 * | 1/2007 | Jackson | E01D 21/00 14/77.1 |
| 7,172,177 | B2 * | 2/2007 | Durda | B01F 3/04595 261/120 |
| 9,016,931 | B2 * | 4/2015 | Rumph | B01F 7/00116 366/285 |
| 2002/0162936 | A1 * | 11/2002 | Mellardo | B01F 7/00741 248/562 |
| 2003/0030157 | A1 * | 2/2003 | Petrescu | B01F 3/04765 261/92 |
| 2005/0279912 | A1 * | 12/2005 | Kozubski | B63H 20/106 248/642 |
| 2006/0135007 | A1 * | 6/2006 | Ide | B63H 20/106 440/53 |
| 2007/0218784 | A1 * | 9/2007 | Douglas | B63H 20/106 440/53 |
| 2010/0296364 | A1 * | 11/2010 | Pensler | B01F 7/00741 366/249 |

* cited by examiner

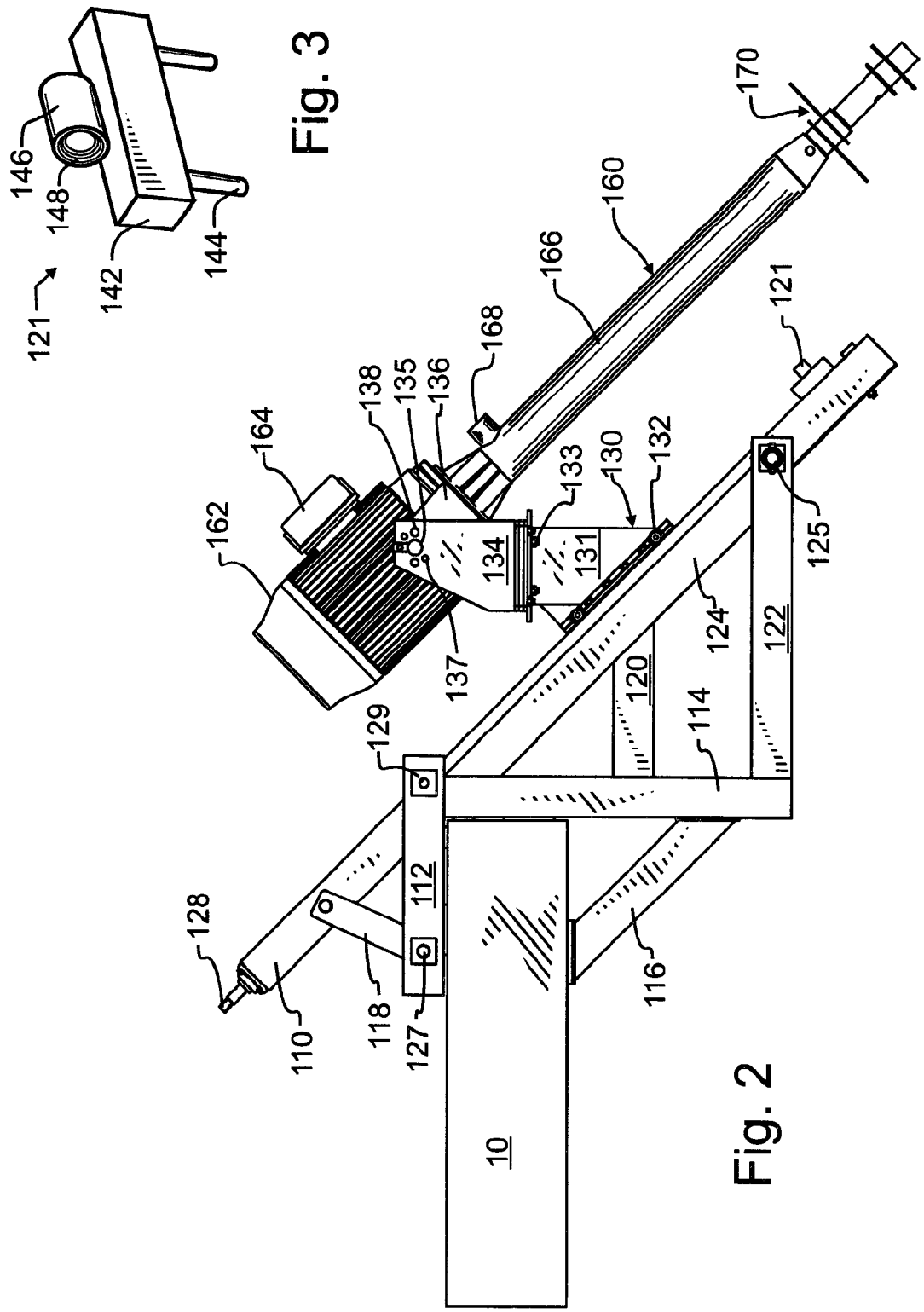

UNIVERSAL BRIDGE AND WALL MOUNTED AERATION APPARATUS

CROSS REFERENCE TO RELATED APPLICATIONS

This application claims the benefit under 35 USC 119(e) of U.S. provisional application Ser. No. 61/891,384 filed Oct. 15, 2013 and herewith, the entire contents incorporated herein by reference.

BACKGROUND OF THE INVENTION

1. Field of the Invention

The present invention pertains generally to gas and liquid contact apparatus, and more particularly to such apparatus using a rotating impeller to deliver a gas at a submerged location. In another manifestation, the present invention pertains generally to liquid purification or separation with means to add a treating gas directly to the liquid through a submerged fluid inlet. In a further manifestation, a gas and liquid contact apparatus is combined with a machinery support providing an operator or actuator to facilitate installing, adjusting, and servicing the apparatus.

2. Description of the Related Art

Aeration apparatuses introduce air into a liquid. While most applications depend upon dissolving at least a portion of the oxygen contained in the air into the liquid, there are at least some applications where the mixing of the air is the important objective. For yet other applications, a gas other than air may be introduced to meet a particular need or desire. The liquid being treated will for exemplary purposes only, and not limiting the present invention thereto, often be contained in one or more ponds, lakes, wastewater lagoons, or various ones of other liquid holding tanks or reservoirs for sewage treatment plants or other diverse application.

Wastewater processing and aquaculture are illustrative of a few of the many applications for modern aeration apparatuses. Most commonly in wastewater processing, increased oxygen content of the wastewater increases the activity of aerobic bacteria, helping to clean and purify the wastewater before it is treated using other means, or released into the ecosystem such as through a river. In the case of aquaculture, increased oxygen content can support increased production of plant and animal species.

A common way to increase oxygen content is to provide an aeration unit mounted to a stationary or at least floating object. The aeration unit will typically include a motor driving a propeller. As the propeller turns, air is actively or passively mixed into the turbulent water and propelled into the water, normally at a downward and lateral angle. For most applications, several horsepower may be required for adequate aeration. For larger commercial applications, there may be a plurality of aeration units provided at different locations about a lagoon or reservoir.

While nearly any type of engine may find application in the aeration apparatus, most are electrically driven since, once connected to an electrical grid, there is a steady and continuous source of power, without the need for periodic refueling required by most gasoline or diesel engines. However, with the benefit of long-term, low maintenance aeration comes the need to keep an electrical motor safely and reliably connected to the electrical grid. This means that it is normally desirable to keep the aeration unit anchored or relatively stationary relative to a stationary or floating object, with the electrical components above the highest liquid level, to avoid unnecessary risks or hazards.

Aeration apparatus are a part of an industry that has been well-developed over the last four decades, with many advances made both by the present assignee and by others in the industry. Exemplary US patents owned by the present assignee, the teachings and contents which are incorporated herein by reference, include: U.S. Pat. No. 4,240,990 by De Veau et al, entitled "Aeration propeller and apparatus"; U.S. Pat. No. 4,280,911 by Durda et al, entitled "Method for treating water"; U.S. Pat. No. 4,293,169 by Inhofer, entitled "Water bearing"; U.S. Pat. No. 4,308,221 by Durda, entitled "Apparatus for mixing a gas and a liquid"; U.S. Pat. No. 4,409,100 by Rajendren, entitled "Liquid aerating device"; U.S. Pat. No. 4,741,825 by Schiller, entitled "Mobile vortex shield"; U.S. Pat. No. 4,774,031 by Schurz, entitled "Aerator"; U.S. Pat. No. 4,806,251 by Durda, entitled "Oscillating propeller type aerator apparatus and method"; U.S. Pat. No. 4,882,099 by Durda et al, entitled "Aeration apparatus having a deicing mechanism and control circuit therefor"; U.S. Pat. No. 4,954,295 by Durda, entitled "Propeller aerator with peripheral injection of fluid and method of using the aerator"; U.S. Pat. No. 5,078,923 by Durda et al, entitled "Aeration apparatus having a deicing mechanism and control circuit therefor"; U.S. Pat. No. 5,707,562 by Karliner, entitled "Turbo aerator"; U.S. Pat. No. 5,744,072 by Karliner, entitled "Method of treating waste water"; U.S. Pat. No. 7,172,177 by Durda, entitled "Aerator"; U.S. Pat. No. 7,465,394 by Durda et al, entitled "Wastewater treatment system"; U.S. Pat. No. 7,678,274 by Durda et al, entitled "Wastewater treatment system"; U.S. Pat. No. 7,892,433 by Durda et al, entitled "Wastewater treatment system"; U.S. Pat. No. 8,110,108 by Durda et al, entitled "Wastewater treatment system"; U.S. Pat. No. 8,236,174 by Durda et al, entitled "Wastewater treatment system"; and Des 401,547 by Karliner, entitled "Aerator float".

Other exemplary patents of varying relevance to aeration, the teachings and contents of each which are incorporated herein by reference, include: U.S. Pat. No. 1,343,797 by Stott et al, entitled "Aeration of sewage and other impure liquids"; U.S. Pat. No. 1,450,326 by Maitland, entitled "Apparatus for treating oils"; U.S. Pat. No. 1,505,479 by Maitland, entitled "Apparatus for treating oils"; U.S. Pat. No. 1,632,758 by Fulweiler et al, entitled "Process of purifying gas"; U.S. Pat. No. 1,639,828 by Wheeler et al, entitled "Process for treating cheese"; U.S. Pat. No. 1,745,412 by Fletcher, entitled "Aerator"; U.S. Pat. No. 1,765,338 by Jones et al, entitled "Agitator, aerator, and mixer"; U.S. Pat. No. 2,061,564 by Drake et al, entitled "Diffusion impeller deflector"; U.S. Pat. No. 2,063,301 by Durdin, Jr., entitled "Aerator"; U.S. Pat. No. 2,082,759 by Walker, entitled "Method and apparatus for treatment of sewage"; U.S. Pat. No. 2,116,023 by Gwidt, entitled "Aerator"; U.S. Pat. No. 2,194,037 by Thuma, entitled "Aerating device for liquids"; U.S. Pat. No. 2,232,388 by Ingalls et al, entitled "Froth flotation apparatus"; U.S. Pat. No. 2,243,301 by Weinig, entitled "Aeration apparatus"; U.S. Pat. No. 2,313,654 by MacLean, entitled "Apparatus for treating liquids with gases"; U.S. Pat. No. 2,410,429 by Daman, entitled "Agitation and aeration apparatus"; U.S. Pat. No. 2,433,592 by Booth, entitled "Aeration method and machine"; U.S. Pat. No. 2,515,538 by Wall, entitled "Water aerator, filter, and heater"; U.S. Pat. No. 2,590,581 by Shirley, entitled "Device for aerating water"; U.S. Pat. No. 2,609,097 by Dering, entitled "Flotation machine"; U.S. Pat. No. 2,641,455 by Poirot, entitled "Device which aerates water"; U.S.

Pat. No. 2,767,965 by Daman, entitled "Dual pumping agitation"; U.S. Pat. No. 2,928,665 by Epprecht, entitled "Gas-liquid mixing apparatus"; U.S. Pat. No. 2,944,802 by Daman, entitled "Froth flotation and aeration apparatus"; U.S. Pat. No. 2,966,345 by Burgoon et al, entitled "Mixing apparatus"; U.S. Pat. No. 3,053,390 by Wood, entitled "Sewage treating apparatus"; U.S. Pat. No. 3,092,678 by Braun, entitled "Apparatus for gasifying liquids"; U.S. Pat. No. 3,108,146 by Gross, entitled "Fluid handling device"; U.S. Pat. No. 3,191,394 by Avery et al, entitled "Conservation arrangement and method"; U.S. Pat. No. 3,193,260 by Lamb, entitled "Apparatus for aerating and eliminating ice on water"; U.S. Pat. No. 3,202,281 by Weston, entitled "Method for the flotation of finely divided minerals"; U.S. Pat. No. 3,210,053 by Boester, entitled "Aerator structure"; U.S. Pat. No. 3,235,234 by Beaudoin, entitled "Apparatus for aerating water"; U.S. Pat. No. 3,278,170 by Moritz, entitled "Apparatus for placing gases and liquids into intimate contact"; U.S. Pat. No. 3,342,331 by Maxwell, entitled "Flotation machine"; U.S. Pat. No. 3,365,178 by Bood, entitled "Apparatus for agitating and aerating exposed bodies of water"; U.S. Pat. No. 3,400,918 by MacLaren, entitled "Sewage aerator"; U.S. Pat. No. 3,411,706 by Woollenweber, Jr. et al, entitled "Bearing durability enhancement device for turbocharger"; U.S. Pat. No. 3,497,185 by Dively, entitled "Aerating and cooling apparatus"; U.S. Pat. No. 3,512,762 by Umbricht, entitled "Apparatus for liquid aeration"; U.S. Pat. No. 3,572,658 by Ravitts, entitled "Floating aerator"; U.S. Pat. No. 3,576,316 by Kaelin, entitled "Apparatus for surface aeration and circulation of liquid"; U.S. Pat. No. 3,584,840 by Fuchs, entitled "Mixing device for introducing additives into a liquid"; U.S. Pat. No. 3,591,149 by Auler, entitled "Aeration apparatus"; U.S. Pat. No. 3,614,072 by Brodie, entitled "Hydraulic flow inducer"; U.S. Pat. No. 3,620,512 by Muskat et al, entitled "Aerating apparatus"; U.S. Pat. No. 3,640,514 by Albritton, entitled "Aeration"; U.S. Pat. No. 3,650,513 by Werner, entitled "Aeration device"; U.S. Pat. No. 3,669,422 by Nogaj, entitled "Aeration apparatus"; U.S. Pat. No. 3,680,845 by Carlsmith et al, entitled "Aerating apparatus and method"; U.S. Pat. No. 3,739,912 by Miller, entitled "Screening and aerating concentrator"; U.S. Pat. No. 3,755,142 by Whipple, entitled "Process and apparatus for the purification of a natural body of water"; U.S. Pat. No. 3,768,788 by Candel, entitled "Liquid aeration method and apparatus"; U.S. Pat. No. 3,775,307 by McWhirter et al, entitled "System for gas sparging into liquid"; U.S. Pat. No. 3,776,531 by Ebner et al, entitled "Apparatus and propeller for entraining fluids in liquids"; U.S. Pat. No. 3,778,233 by Blough et al, entitled "Apparatus for liquid composting"; U.S. Pat. No. 3,782,702 by King, entitled "Apparatus for mixing and treating fluids"; U.S. Pat. No. 3,794,303 by Hirshon, entitled "Method and apparatus for aerating bodies of water"; U.S. Pat. No. 3,797,809 by Sydnor, entitled "Aerator apparatus"; U.S. Pat. No. 3,829,070 by Imants et al, entitled "Gasification system"; U.S. Pat. No. 3,836,130 by Johnson et al, entitled "Liquid aerating apparatus"; U.S. Pat. No. 3,840,457 by Wilson, entitled "Method and apparatus for treating animal waste"; U.S. Pat. No. 3,846,292 by Le Compte, Jr., entitled "Ejector aerated oxidation ditch for waste treatment"; U.S. Pat. No. 3,893,924 by Le Compte, Jr. et al, entitled "Aerobic lagoon waste treatment system and method"; U.S. Pat. No. 3,975,469 by Fuchs, entitled "Device for revolving liquids and supplying gas thereto"; U.S. Pat. No. 3,984,323 by Evens, entitled "Apparatus for purifying polluted water"; U.S. Pat. No. 4,045,522 by Nafziger, entitled "Animal waste treatment system"; U.S. Pat. No. 4,051,035 by Boschen et al, entitled "Apparatus for the aerobic treatment of liquid waste"; U.S. Pat. No. 4,066,722 by Pietruszewski et al, entitled "Apparatus for sparging gas into liquid"; U.S. Pat. No. 4,070,279 by Armstrong, entitled "Eductor for dissolving gases in liquids"; U.S. Pat. No. 4,145,383 by Randall, entitled "Slurry aeration method and apparatus"; U.S. Pat. No. 4,169,047 by Wilson, entitled "Flotation machine with mixing and aeration impeller and method"; U.S. Pat. No. 4,190,619 by Cherne, entitled "Liquid aerating rotor assembly"; U.S. Pat. No. 4,193,951 by Stanley, entitled "Water aerating device"; U.S. Pat. No. 4,207,180 by Chang, entitled "Gas-liquid reaction method and apparatus"; U.S. Pat. No. 4,216,091 by Mineau, entitled "Water aerator"; U.S. Pat. No. 4,242,199 by Kelley, entitled "Aerator apparatus"; U.S. Pat. No. 4,268,398 by Shuck et al, entitled "Sludge agitating method"; U.S. Pat. No. 4,279,753 by Nielson et al, entitled "Wastewater treatment system including multiple stages of alternate aerobic-anerobic bioreactors in series"; U.S. Pat. No. 4,288,394 by Ewing et al, entitled "Sewage aeration system"; U.S. Pat. No. 4,290,979 by Sugiura, entitled "Aeration apparatus"; U.S. Pat. No. 4,308,137 by Freeman, entitled "Water aeration and circulation apparatus"; U.S. Pat. No. 4,308,138 by Woltman, entitled "Treating means for bodies of water"; U.S. Pat. No. 4,318,871 by Mentz, entitled "Mounting ring construction for surface aerator apparatus"; U.S. Pat. No. 4,334,826 by Connolly et al, entitled "Surface aerator impeller"; U.S. Pat. No. 4,350,589 by Stog, entitled "Floating jet aerator"; U.S. Pat. No. 4,350,648 by Watkins III et al, entitled "Floating aerator"; U.S. Pat. No. 4,431,597 by Cramer et al, entitled "Horizontal mixing aerator"; U.S. Pat. No. 4,443,338 by Reid, entitled "Conversion of plug flow and complete mix aeration basins to barrier oxidation ditches"; U.S. Pat. No. 4,468,358 by Haegeman, entitled "Apparatus for mixing air and liquid"; U.S. Pat. No. 4,540,528 by Haegeman, entitled "Apparatus for mixing gas and liquid"; U.S. Pat. No. 4,587,064 by Blum, entitled "Aeration apparatus for large waters"; U.S. Pat. No. 4,676,654 by Fleckner, entitled "Agitator device"; U.S. Pat. No. 4,732,682 by Rymal, entitled "Aeration apparatus and method"; U.S. Pat. No. 4,734,235 by Holyoak, entitled "Aerator"; U.S. Pat. No. 4,741,870 by Gross, entitled "Apparatus for treatment of liquids"; U.S. Pat. No. 4,818,391 by Love, entitled "Integral Clarifier"; U.S. Pat. No. 4,842,732 by Tharp, entitled "Apparatus for aerating and mixing waste water"; U.S. Pat. No. 4,844,816 by Fuchs et al, entitled "Method of aeration at specific depth and pressure conditions"; U.S. Pat. No. 4,844,843 by Rajendren, entitled "Waste water aerator having rotating compression blades"; U.S. Pat. No. 4,909,936 by Arbisi et al, entitled "Water aerating system"; U.S. Pat. No. 4,975,197 by Wittmann et al, entitled "Orbal wastewater treatment process"; U.S. Pat. No. 4,997,557 by Andersen, entitled "Floating, mixing, aerating and decanting unit"; U.S. Pat. No. 5,011,631 by Hwang, entitled "Turbo-jet aerator"; U.S. Pat. No. 5,021,154 by Haegeman, entitled "Mixer/aerator for waste water"; U.S. Pat. No. 5,076,929 by Fuchs et al, entitled "Sewage lagoon system"; U.S. Pat. No. 5,110,510 by Norcross, entitled "Aeration and mixing apparatus"; U.S. Pat. No. 5,116,501 by House, entitled "Paddle-wheel aerator drive mechanism"; U.S. Pat. No. 5,122,266 by Kent, entitled "Apparatus for advanced aquaculture life support"; U.S. Pat. No. 5,160,620 by Lygren, entitled "Method and apparatus for treating water"; U.S. Pat. No. 5,160,667 by Gross et al, entitled "Bearing protection device for liquid aerators"; U.S. Pat. No. 5,185,080 by Boyle, entitled "Process for the on-site removal of nitrates from wastewater"; U.S. Pat. No. 5,211,847 by Kanow, entitled "Denitrification methods"; U.S. Pat. No. 5,213,718 by Burgess, entitled "Aerator and conversion methods"; U.S. Pat. No. 5,223,130 by Valfrido, entitled "Device for organic neutralization and removal of phosphorus compounds present in water basins"; U.S. Pat. No. 5,275,722 by Beard, entitled "Oxidation ditch wastewater treatment and denitrification system"; U.S. Pat. No. 5,275,762 by Burgess, entitled "Aerator"; U.S. Pat. No. 5,300,261 by Von Berg, entitled "Liquid aerating apparatus"; U.S. Pat. No. 5,312,567 by Kozma et al, entitled "Complex mixer for dispersion of gases in liquid"; U.S. Pat. No. 5,316,671 by Murphy, entitled "Submersible aeration train and aeration apparatus for biological purification of sewage"; U.S. Pat. No. 5,326,459 by Hlavach et al, entitled "Wastewater treatment apparatus"; U.S. Pat. No. 5,344,557 by Scanzillo, entitled "Incubator for biological cleaning of fluids"; U.S. Pat. No. 5,354,457 by Becchi, entitled "Water treatment equipment"; U.S. Pat. No. 5,356,569 by Von Berg, entitled "Liquid aerating apparatus"; U.S. Pat. No. 5,389,247 by Woodside, entitled "Waste water treatment process"; U.S. Pat. No. 5,421,999 by Poole et al, entitled "Floating nitrification reactor in a treatment pond"; U.S. Pat. No. 5,531,894 by Ball et al, entitled "Method of treating wastewater"; U.S. Pat. No. 5,545,327 by Volland, entitled "Wastewater treatment method and apparatus"; U.S. Pat. No. 5,554,291 by Scanzillo et al, entitled "Methods and apparatus for biodegradation of polluted fluids"; U.S. Pat. No. 5,582,734 by Coleman et al, entitled "Oxidation ditch modification and automated control system for nitrogen removal and sludge settling improvements"; U.S. Pat. No. 5,741,443 by Gemza, entitled "Oxygenation of stratified water"; U.S. Pat. No. 5,795,504 by Berchotteau, entitled "Apparatus for feeding and diffusing air or another gas into a liquid"; U.S. Pat. No. 5,846,425 by Whiteman, entitled "Methods for treatment of waste streams"; U.S. Pat. No. 5,851,443 by Rajendren, entitled "Aerator with dual path discharge"; U.S. Pat. No. 5,861,095 by Vogel et al, entitled "Method and device for treating wastewater"; U.S. Pat. No. 5,863,435 by Heijnen et al, entitled "Biological treatment of wastewater"; U.S. Pat. No. 5,868,091 by Gross et al, entitled "Float mounted aerator having a work deck"; U.S. Pat. No. 5,972,212 by Hongo, entitled "Apparatus for treating organic waste water utilizing microorganisms"; U.S. Pat. No. 5,988,604 by McWhirter, entitled "Mixing impellers especially adapted for use in surface aeration"; U.S. Pat. No. 5,996,977 by Burgess, entitled "Temperature adjusted water aerator and circulation system"; U.S. Pat. No. 6,022,476 by Hausin, entitled "Water treatment process"; U.S. Pat. No. 6,050,550 by Burgess, entitled "Apparatus for aeration and bottom agitation for aqua-culture systems"; U.S. Pat. No. 6,103,123 by Gantzer, entitled "Aeration device and method for creating and maintaining facultative lagoon"; U.S. Pat. No. 6,276,670 by Jacobs, entitled "Combined mixer-aerator"; U.S. Pat. No. 6,325,842 by Caldwell et al, entitled "Method and apparatus for aerating"; U.S. Pat. No. 6,328,289 by Becchi, entitled "Device for treating water in a basin"; U.S. Pat. No. 6,348,147 by Long, entitled "Fluid flow system for floating biological contactor"; U.S. Pat. No. 6,514,410 by Gantzer, entitled "Odor control apparatus for facultative lagoon"; U.S. Pat. No. 6,821,426 by Hausin et al, entitled "Process for treating a body of water"; and U.S. Pat. No. 7,008,538 by Kasparian et al, entitled "Single vessel multi-zone wastewater bio-treatment system".

A variety of support anchors and floats are illustrated in the aforementioned patents, and these support anchors and floats have generally performed quite well over the years. Nevertheless, historically these mounts for aeration units were custom-created for each application. This is costly and time-consuming, and the aeration apparatus, anchors and floats cannot readily be adjusted after installation. Where the liquid body to be treated is irregular, large, or complex, even the best of planning and design may yield less than optimal results. This in turn then requires that the aeration apparatus most preferably be adjustable, to allow the system to be fine tuned to achieve desired optimal results.

In addition to system adjustment and tuning, installation can also be challenging for some of the existing support anchor and float designs. An aeration support will preferably be mounted out of the liquid, thereby permitting the support to be installed dry. Dry installation is safer not only due to the hazards of electrical machinery and water, but also due to the increased risk of personnel slipping and falling on a wet and therefore more slippery surface. Similarly, machinery will from time to time require maintenance or servicing. Such maintenance is, of course, preferably also achieved out of the liquid. Consequently, there has been and still remains a need for a much more universally mounted aeration system that may be coupled to very diverse anchors and floats, that preferably permits dry installation and servicing.

In addition to the more relevant aeration-related patents, several additional patents showing less relevant and otherwise unrelated machine supports and the like have also been identified by the present applicants, the teachings and contents which are nevertheless incorporated by reference, including: U.S. Pat. No. 565,346 by Goodyear, entitled "Optical lantern"; U.S. Pat. No. 1,511,336 by Hoey, entitled "Adjustable mounting device"; U.S. Pat. No. 2,346,217 by Heybourne, entitled "Light support for document photographing cameras"; U.S. Pat. No. 3,164,353 by Rene, entitled "Variable pitch roof bracket"; U.S. Pat. No. 7,159,262 by Jackson, entitled "Bridge overhang bracket"; U.S. Pat. No. 7,354,323 by Mayers, entitled "Motor mount for watercraft"; U.S. Pat. No. 7,407,419 by Douglas, entitled "Outboard engine mounting assembly"; and U.S. Pat. No. 7,522,213 by Chapman, entitled "Shock and vibration isolator for a camera".

In addition to the foregoing patents, Webster's New Universal Unabridged Dictionary, Second Edition copyright 1983, is incorporated herein by reference in entirety for the definitions of words and terms used herein.

SUMMARY OF THE INVENTION

In a first manifestation, the invention is a mounted aeration unit. The aeration unit has a motor and an aerator at least partially submerged within a liquid and driven by the motor. The mount has a track; at least one horizontal wall brace; and at least one vertical wall brace rigidly affixed to the at least one horizontal wall brace and extending down therefrom. At least one lower track support bar extends horizontally from adjacent a lower end of the at least one vertical wall brace. A pedestal rests on the track. A selective mover is operative longitudinally co-extensive with the track and is adapted to operatively move the pedestal relative to the track. A first bracket is affixed to the pedestal and rotatable about a vertical axis with respect thereto. A second bracket is rotatably affixed to the first bracket about a horizontal axis and supports the aeration unit thereupon.

In a second manifestation, the invention is, in combination, a wall and bridge mount, a track extending between two distinct elevations and coupled to the wall and bridge mount, an aeration unit pivotally coupled to the track and having an aerator adapted to operatively at least partially submerge within and aerate a liquid, and a drive adapted to operatively move the aeration unit along the track and thereby vary an elevation of the aeration unit.

In a third manifestation, the invention is a universal bridge and wall mounted aeration unit having a first configuration adapted to couple with a bridge defining a generally horizontal plane and a second configuration adapted to couple with a wall defining a generally vertical plane. The aeration unit has a motor, and an aerator at least partially submerged within a liquid and driven by the motor. A mount has a track; at least one horizontal wall brace; at least one vertical wall brace rigidly affixed to the at least one horizontal wall brace and that extends down therefrom; at least one lower track support bar extending horizontally from adjacent a lower end of the at least one vertical wall brace; a pedestal resting on the track; and a selective mover operative longitudinally co-extensive with the track and adapted to operatively move the pedestal relative to the track. A first bracket is affixed to the pedestal and rotatable about a vertical axis with respect thereto. A second bracket is rotatably affixed to the first bracket about a horizontal axis and supports the aeration unit thereupon. At least one detachable diagonal wall brace in the first configuration is rigidly affixed to the at least one vertical wall brace and extends at an angle relative to the at least one horizontal wall brace and extends vertically to reach a lesser vertical height than the at least one horizontal wall brace. A vertical gap is defined between the at least one diagonal wall brace and at least one horizontal wall brace which is operative to span two opposed major surfaces of a bridge in the first configuration, and in the second configuration the at least one diagonal wall brace is detached from the at least one vertical wall brace.

OBJECTS OF THE INVENTION

Exemplary embodiments of the present invention solve inadequacies of the prior art by providing an aeration unit having a motor, a propeller, and a shaft that couples the motor to the propeller. A universal mount supports the aeration unit and operatively may be affixed to a structure such as a stationary bridge or wall, and may be adjusted to position the propeller after installation under the surface of the liquid. In one embodiment, the shaft may include an opening above the liquid surface that allows for the intake of air. Under the liquid surface, another opening allows for the expelling of air. In one embodiment, suction is preferably created behind the propeller blades when the propeller begins to spin, and this suction draws air either into the shaft to then be mixed into the liquid, or in a yet further alternative embodiment draws air from the surface directly into the liquid. In another embodiment, a blower may be provided to force air into the shaft of the propeller and out through an expeller opening, with the blower thereby actively forcing air through the shaft and into the liquid.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide an aeration apparatus and support that may be mass produced to reduce variability and cost, and which may be used in many diverse applications by mounting to a variety of structures such as bridges, walls and the like. A second object of the invention is for the support to accommodate a variety of diverse aeration units, further enabling the benefits of mass produced apparatus while also enabling precise configuration to a single particular application. Another object of the present invention is to provide a means to adjust shaft horizontal and vertical angles and propeller depth of a mounted aeration unit through a wide range, allowing for coupling to different structures; different containment area depths and geometries and contents; and different treatment designs and objectives. In a preferred embodiment, this adjustment may be made through three axes of motion. A further object of the invention is to improve the safety and convenience of installing, adjusting, servicing, and otherwise maintaining the aeration apparatus. In consideration thereof and in at least some embodiments an aeration mount is provided that may be installed above the liquid and without any submersion, and that permits a supported aeration unit to be retracted fully from a liquid basin. Yet another object of the present invention is to achieve the foregoing objectives while consuming a minimal footprint upon the surface of a wall or bridge or similar structure, thereby preserving surface area for a person to access the aeration apparatus and support.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which:

FIG. 2 illustrates the first preferred embodiment universal bridge and wall mounted aeration apparatus of FIG. 1 from a side elevational view coupled to a bridge structure.

FIG. 3 illustrates a preferred embodiment track stop, optionally used in the first preferred embodiment universal bridge and wall mounted aeration apparatus of FIG. 1, from a perspective view.

DESCRIPTION OF THE PREFERRED EMBODIMENT

Figure 1:
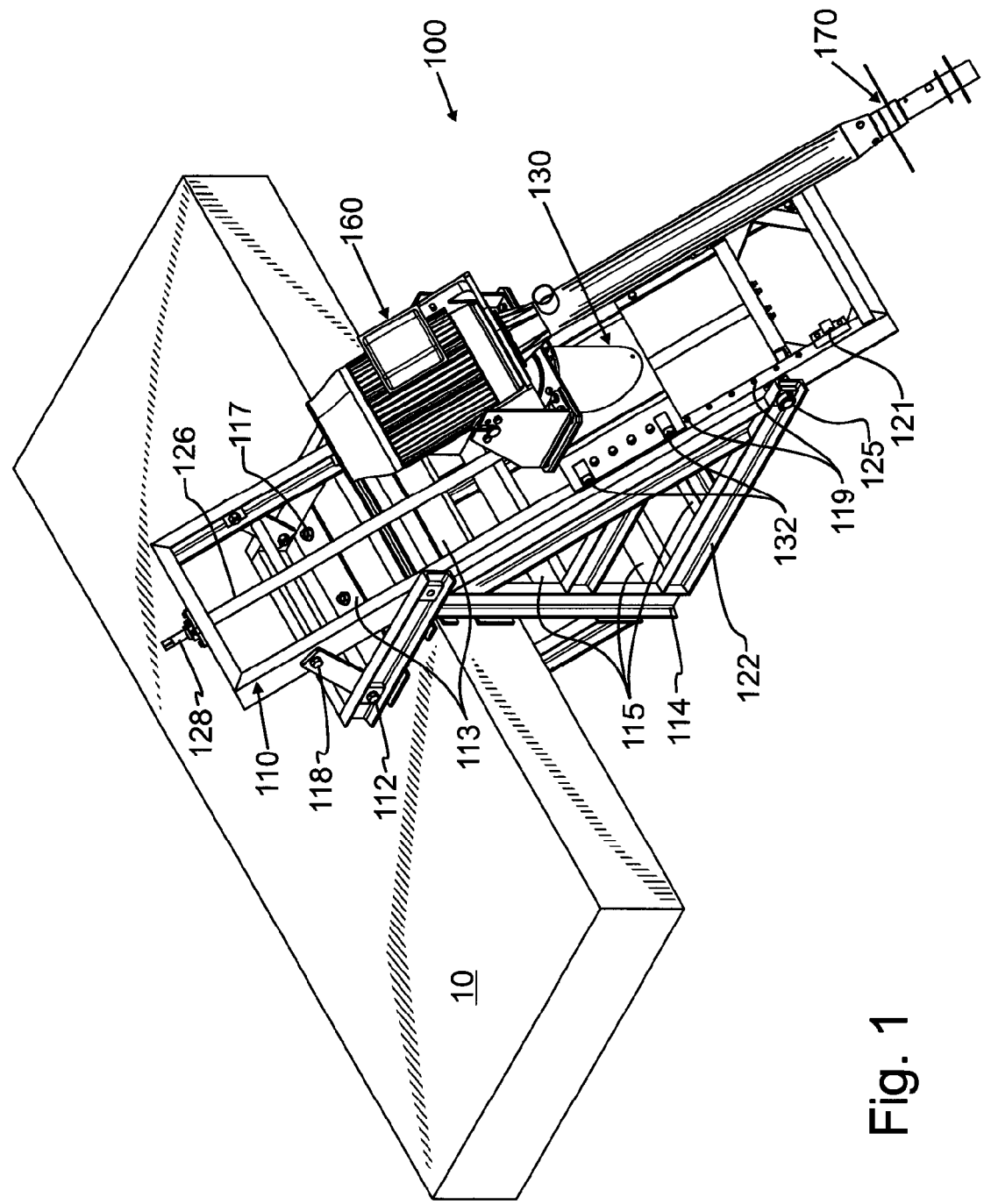
FIG. 1 illustrates a first preferred embodiment universal bridge and wall mounted aeration apparatus designed in accord with the teachings of the present invention from a perspective view and coupled to a bridge structure.
Figure 4:
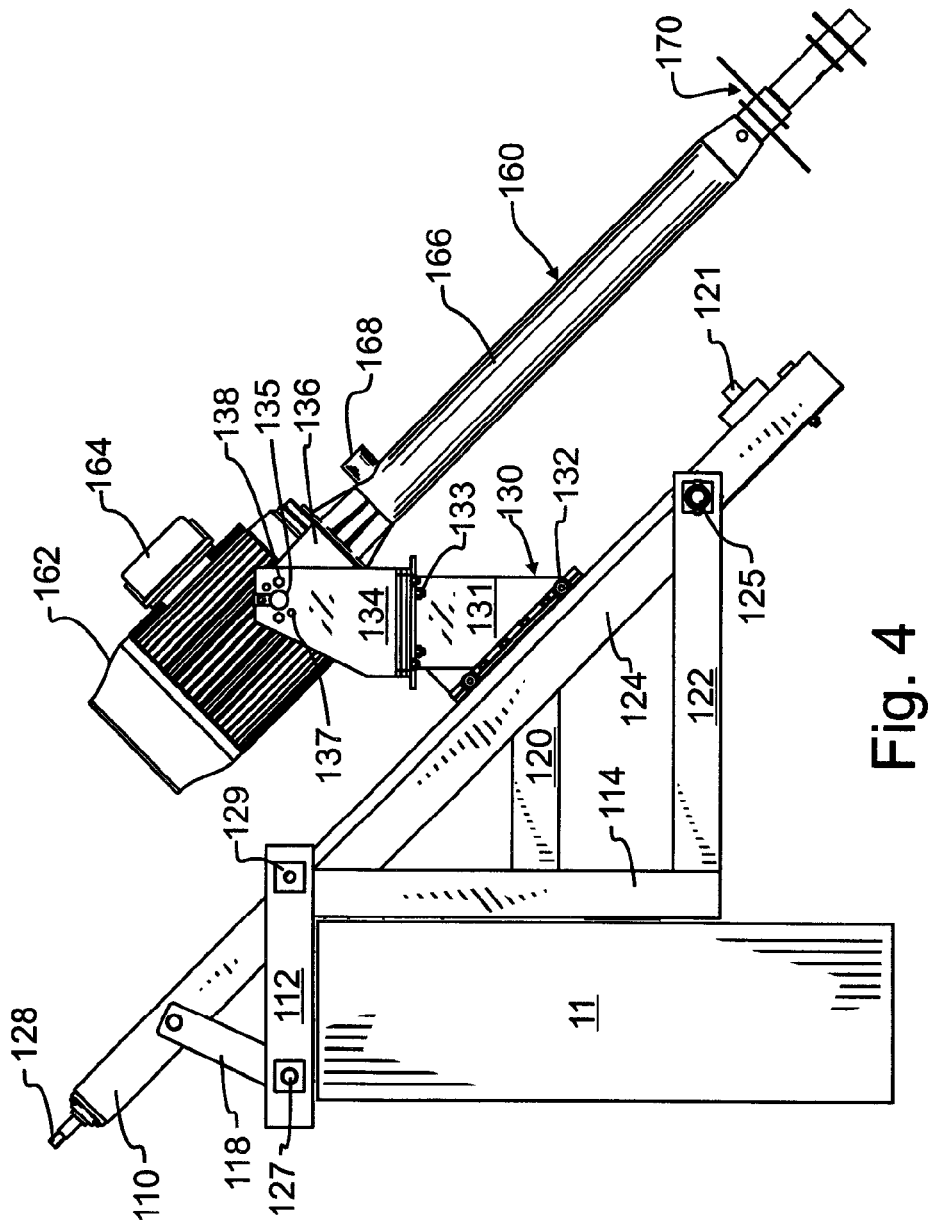
FIG. 4 illustrates the first preferred embodiment universal bridge and wall mounted aeration apparatus of FIG. 1 from a side elevational view and coupled to a wall structure.

Manifested in the preferred embodiments, the present invention provides a universal bridge and wall mounted aeration unit 100 having an aeration unit 160 including a motor 162, a motor electrical access panel 164, an air or other gas inlet 168, a propeller 170, and a shaft 166 that couples motor 162 to propeller 170. The universal bridge and wall mounted aeration unit 100 may operatively be affixed to a structure such as a stationary bridge 10 or wall 11, and may be adjusted to position propeller 170 after installation under the surface of the liquid.

In a first preferred embodiment of the invention illustrated in FIGS. 1-4, universal bridge and wall mounted aeration unit 100 is comprised of:

a track 110 formed from two parallel long bars connected for exemplary purposes by one or more bars and in the preferred embodiment by two perpendicular bars adjacent the distal ends of the parallel long bars;

horizontal wall braces 112 consisting of two parallel horizontal bars and a perpendicular horizontal bar connecting the horizontal bars on one end, herein referred to as the back end;

two vertical bars that define vertical wall braces 114 rigidly affixed to two parallel horizontal wall braces 112 and that extend down therefrom;

two diagonal wall braces 116 rigidly affixed to vertical wall braces 114 comprising bars that extend upwards and backwards for exemplary purposes at an approximately 45-degree angle relative to horizontal wall braces 112 and to approximately the same horizontal distance as horizontal wall braces 112, but which do not extend vertically to reach the same height as horizontal wall braces 112, and thereby define a gap therebetween which spans two surfaces of a bridge 10 or other generally horizontal supporting structure, such that horizontal wall braces 112 for exemplary purposes will rest upon the top surface of bridge 10 while diagonal wall braces 116 will for exemplary purposes engage with the bottom surface of bridge 10;

lower track support bars 122 comprising for exemplary purposes two or more bars extending horizontally forward from adjacent the lower ends each of vertical wall braces 114;

additional track support bars 118 comprising for exemplary purposes two or more bars extending upwards and forward from parallel horizontal wall braces 112 and arranged so that the angle between bars 118 and vertical wall braces 114 forms for exemplary purposes an approximately 45-degree angle;

track 110 preferably rotatably affixed to lowest track support bars 122 and topmost track support bars 118;

diagonal track support bars 124 rigidly affixed to track support bars 122 and vertical wall braces 114, comprising for exemplary purposes one bar on each side placed at an approximately 45-degree angle from horizontal, extending downward and forward and connecting adjacent to track support bar 122 ends;

optional additional track support bars 120 comprising for exemplary purposes two or more bars extending approximately horizontally forward from adjacent vertical wall braces 114 and terminating at diagonal track support bar 124;

a selective mover, which in the preferred embodiment universal bridge and wall mounted aeration unit 100 comprises a jackscrew 126 preferably longitudinally co-extensive with and longitudinally bisecting track 110;

a plate and pedestal 130 affixed to jackscrew 126 and resting on the top of track 110 and carried thereupon by one or more friction reducing members such as rollers 132 as illustrated in the preferred embodiment; and two U-brackets 134, 136, one U-bracket 134 preferably affixed to pedestal 130 and rotatable about a vertical axis with respect thereto, and second U-bracket 136 preferably rotatably affixed with first U-bracket 134 about a horizontal axis, U-brackets 134, 136 operative to further support an aeration unit 160 thereupon.

It is important to note that track 110 is not directly affixed to or anchored by diagonal track support bars 124. Instead, diagonal track support bars 124 are fixed in position and anchored relative to bridge 10 or wall 11, while track 110 may be pivoted about pintle 125 to change the slope or angle of shaft 166 into the tank, pool, water, treatment receptacle or other fluid body intended to be aerated.

As can be seen in FIGS. 1-4, preferred embodiment universal bridge and wall mounted aeration unit 100 is attached to a surface, preferably a metal or concrete bridge 10 or wall 11; however, another stable surface would suffice, such as an anchored floating platform. FIG. 1 illustrates mounting bolts 117 that are preferably installed through one or more of reinforcement beams 113 to provide secure coupling to a bridge 10 or wall 11. Reinforcement beams 113 preferably provide both a suitable site for installing mounting bolts 117 and also add strength and stability to horizontal and vertical wall braces 112, 114 shown in FIG. 2. Horizontal and vertical wall braces 112, 114 are preferably installed adjacent to the top and side of the attachment surface, minimizing torque forces, and are preferably rigidly affixed to each other and to the mounting surface.

An optional diagonal wall brace 116 best visible in FIG. 2 provides additional stability to installation sites in which vertical wall brace 114 continues below the attachment surface, such as below a bridge 10 illustrated in FIG. 2 or other similar more horizontal structures. In the case of a vertical wall 11 illustrated in FIG. 4, diagonal wall brace 116 may be unnecessary and so may be removed or not provided. Alternatively, where horizontal wall brace 112 is longer than the width of vertical wall 11 upon which brace 112 rests, then diagonal wall brace 116 may be switched from extending from vertical wall brace 114 as illustrated in FIG. 2 to alternatively couple adjacent first alternative coupling point 127 and extend from horizontal wall brace 112 downward and forward towards and terminating against the face of vertical wall 11 spaced from vertical wall brace 114. In this position, a gap is defined between diagonal wall brace 116 and vertical wall brace 114, the width of the gap which would desirably match or be similar to the width of vertical wall 11.

Lower track support bars 122 illustrated in FIG. 2 are in the preferred embodiment rigidly affixed to vertical wall braces 114. Diagonal track support bar 124 is also rigidly affixed to lowermost track support bar 122 and vertical wall brace 114, and extends diagonally there between. This ensures that preferred embodiment universal bridge and wall mounted aeration unit 100 is stable and secure, and the arrangement allows the forces applied from mounted track 110 and aeration unit 160 to be distributed in such a way that minimizes stress to universal bridge and wall mounted aeration unit 100. For example, the vertical forces applied to the front end of lower two track support bars 122 generates torque that could weaken the connection between track support bars 122 and vertical wall brace 114. However, diagonal track support bars 124 provide support to counteract these torque forces. Additionally, the lateral forces applied to vertical wall brace 114 by track support bars 122 is mitigated either by diagonal wall brace 116 or by bridge 10, wall 11 or other mounting surface.

As visible in FIG. 1, ladder supports 115 preferably further reinforce the preferred embodiment, helping to mitigate lateral forces. Additionally, these ladder supports 115 may optionally facilitate maintenance by providing surfaces for a person to step and move around upon.

As illustrated in FIGS. 1-4, track 110 is preferably pivotally secured to track support bars 122 through a pintle 125.

Movement of pedestal 130, U-brackets 134, 136 and aeration unit 160 relative to track 110 is preferably controlled by a drive. The drive illustrated in the preferred embodiment is a jackscrew 126, though other suitable apparatus are contemplated herein. For exemplary purposes only, and not solely limiting the present invention thereto, a fluid drive such as a pneumatic or hydraulic drive, a cable drive, or any other known equivalents in the mechanical arts may be used. Jackscrew 126 in the preferred embodiment begins above the top end of track 110 and terminates at a point near the bottom of track 110. Jackscrew actuation point 128 allows jackscrew 126 to be rotated with an actuating mechanism. For exemplary purposes only, and not solely limiting the present invention thereto, this actuating mechanism may be a drill, other motor or hand crank, or any other known equivalents. When jackscrew 126 is rotated, attached pedestal 130 is moved along track 110, the direction of movement depending on the direction of rotation of jackscrew 126. This changes the height of attached aeration unit 160.

FIGS. 1-4 also illustrate optional track stop 121. Stop 121 preferably prevents pedestal 130 from going too low on track 110 for a particular application, either due to differing aeration or mixing effects at specific heights, as a safety feature to prevent propeller 170 from contacting the bottom of a containment area, or to otherwise limit or control the extent of travel of pedestal 130 for a particular installation.

Stop 121, which is illustrated in greater detail in FIG. 3, comprises a generally rectangular stop body 142 with two projecting pegs 144 on the underside. These two pegs 144 preferably insert into stop holes 119 that are spaced along track 110. The particular number or geometry of pegs 144 is not critical to the present invention, and so might for exemplary and non-limiting purposes comprise a single triangular or square peg, wherein the use of a polygonal cross-section prevents such a peg from rotating about the longitudinal axis of peg 144. The use of more than one peg, such as two illustrated herein, also prevents rotation of stop 121. As may be appreciated, more than two pegs 144 may be used. Furthermore, and also for exemplary purposes, any other known apparatus operative to affix and release stop 121 from track 110 may be used instead of or in addition to one or more pegs 144.

A receiver 146 in stop 121 may be provided that has a coupling 148 such as internal threading as illustrated that is accessible from the top of stop 121, as illustrated in FIG. 3. This receiver 146 having threading 148 allows a user to stand at the top of track 110 on bridge 10 and insert a stick, similar to a broom handle, into threading 148, rotate the stick to secure with threading 148, lift stop 121 out, and change which stop holes 119 stop pegs 144 are inserted into. As may be appreciated, the use of pegs 144 facilitates this, since pegs 144 will both securely hold stops 121 when pedestal 130 impinges, and pegs 144 are easily removed by a person holding the broom-handle like stick.

Preferably, a stop 121 is located on each side of track 110, to provide balanced forces when pedestal 130 encounters stops 121. While this is the preferred embodiment stop 121, alternative stopping mechanisms may be used to prevent pedestal 130 from being lowered too far, such as a clamp, an actuating stop, or travel limits built into or controlled through features in jackscrew 126.

Pedestal 130 is preferably held onto track 110 by a supporting plate to which jackscrew 126 and a plurality of rollers 132, such as four rollers 132 illustrated for exemplary purposes in the preferred embodiment shown in FIG. 1, are coupled. Jackscrew 126 preferably prevents pedestal 130 from rotating or lifting off track 110, while also positioning pedestal 130 along track 110. Rollers 132 or other known equivalents are preferably provided to reduce friction between track 110 and pedestal 130 when jackscrew 126 is being turned. The use of an anti-friction device such as rollers 132 or other known equivalent is preferred, since the weight of aeration unit 160 can be quite substantial, and the friction that could be generated between pedestal 130 and track 110 without such an anti-friction device might otherwise lead to undesirable binding, wear, and eventual destruction.

As illustrated in FIGS. 1-4, pedestal 130 preferably provides support for an aeration unit 160. FIG. 2 illustrates the connection between aeration unit 160 and pedestal 130. Preferably, an inner U-bracket 136 is rigidly affixed to aeration unit 160 on the underside of motor housing 162, thereby desirably locating the center of mass as close to bracket 136 as is possible. Inner U-bracket 136 is preferably rotatably affixed to an outer U-bracket 134 by a connection pivotal about a horizontal axis. The pivotal connection may be any suitable pivoting connection 135 such as a ball-bearing and clamp combination, but in the preferred embodiment a simple pintle or bushing and bolts are used. Around pivoting connection 135 are preferably several bracket lock holes 137 through which bolts 138 can be inserted. Bracket lock holes 137 on inner U-bracket 136 can preferably be aligned to bracket lock holes 137 on outer U-bracket 134 in multiple ways, such that motor housing 162 can be positioned at multiple angles relative to track 110. For exemplary purposes only, and not solely limiting thereto, in the preferred embodiment bracket lock holes 137 are positioned so that aeration unit 160 may be placed at a 38-, 45-, 50-, 55-, or 60-degree angle from vertical; however, in alternate embodiments, bracket lock holes 137 could be placed closer or farther apart in order to change the incremental difference between bracket lock holes 137, as desired for manufacturing or installation specifications. As also noted herein above, where desired other adjustable couplings may alternatively be provided. Nevertheless, the simplicity and positive locking provided by the preferred pivoting connection 135, bracket lock holes 137 and bolts 138 is preferred for many applications.

Pedestal 130 preferably contains a pedestal column 131 terminating at a pedestal top coupler 133 having lock holes that form a circle around the top of pedestal top coupler 133. The base of outer U-bracket 134 preferably contains four pedestal lock holes, though the exact number is not critical to the present invention. This arrangement allows the base of outer U-bracket 134 to be attached to a pedestal top coupler 133 by bolts 138 inserted through holes in pedestal 130 in multiple positions, so that the horizontal orientation of aeration unit 160 about a vertical axis is adjustable by rotation about that vertical axis. The number of holes and the hole spacing is adjustable based on design, manufacturing or installation specifications. This rotatable connection secures pedestal 130 to the base of outer U-bracket 134 in order to aid in the adjustment of the horizontal angle of aeration unit 160 without allowing aeration unit 160 to accidently become disconnected from pedestal 130.

The combination of horizontal and vertical angle versatility of aeration unit 160 from pedestal 130, including bracket locking mechanisms and adjustable height through jackscrew 126 actuation allows for reduced variation between different installations, reduced design and manufacturing expenses, decreased installation costs, versatility in vertical depth operation, increased versatility in placement and orientation of an aeration unit 160, and easier access for installation and maintenance. Different containment areas and different units have different needs in terms of propeller depth and propeller angle. The preferred embodiment can be customized at the time of installation and after installation in order to accommodate the different needs of the containment area, as may be determined to be ideal for efficacy and running costs based on the site.

Track 110 is preferably rotatably attached to lowest track support bar 122 by bolts or a suitable alternative pivoting connection at pintle 125, and attached to topmost track support bar 118 by bolts or other suitable pivotal connection. This arrangement allows the bolts or other fasteners to be loosened or removed and track 110 rotated. Track 110 in the preferred embodiment illustrated in FIG. 2 is additionally adjustable by separating topmost track support bar 118 from horizontal wall brace 112 at first alternative coupling point 127, such as by unbolting. Next, topmost track support bar 118 is moved to a second alternative coupling point 129 at the right hand side of horizontal wall brace 112, near to the connection between horizontal wall brace 112 and vertical wall brace 114. By attaching track support bar 118 at this second alternative connection point, track 110 is tilted to a greater angle of inclination.

As may be apparent, while two alternative coupling points 127, 129 are illustrated for topmost track support bar 118 to horizontal wall brace 112, one or many such connection points may be provided, depending upon the degree of adjustability of this track support angle of inclination. In an alternative embodiment further contemplated herein, top track support bars 118 may be comprised of extendible or rotatable members. For exemplary purposes only, and not solely limiting thereto, two pivotally connected bars may be used as an alternative to the illustrated single track support bar 118. In this alternative embodiment, the two bars may hinge with respect to each other, thereby pivoting track 110 to varying angles with respect to horizontal.

In accord with a preferred method of use, a user can raise pedestal 130 all the way to the top by rotation of jackscrew 126 and perform maintenance from bridge 10. FIG. 1 also illustrates optional ladder supports 115 upon which a person can optionally stand and move around upon while performing maintenance or during installation. This accessibility and adjustability allows a user to perform installation or maintenance on universal bridge and wall mounted aeration unit 100 or on aeration unit 160 primarily from wall or bridge 10 without the use of a separate service platform and without necessitating draining of a basin or other body of liquid, saving costs and improving the safety of the maintenance and installation personnel.

The particular technique used to couple the various horizontal wall braces 112, beams 113, vertical wall braces 114, ladder supports 115, diagonal wall braces 116, track support bars 118, optional track support bars 120, track support bars 122, and diagonal track support bars 124 will vary depending upon the intent at the time of design. As may be appreciated, these components may be welded or otherwise permanently and rigidly coupled. However, for some applications it may be desirable to enable universal bridge and wall mounted aeration unit 100 to be shipped from manufacturing location to installation site in an only partially assembled configuration. In such instances, some of the various components may be shipped unattached, and then affixed at the installation site. In these instances, known fasteners may be used to couple the components together. For exemplary and non-limiting purposes, in one embodiment beams 113 and ladder supports 115 may be left unattached at the manufacturing location, and then coupled into the remainder of universal bridge and wall mounted aeration unit 100 using bolts or other equivalent fastener at the installation site. In a second embodiment, horizontal wall braces 112 and diagonal wall braces 116 may be left unattached at the manufacturing location, and then coupled into the remainder of universal bridge and wall mounted aeration unit 100 using bolts or other equivalent fastener at the installation site. In a third embodiment, capable of providing very compact shipping from the manufacturing location, beams 113 and ladder supports 115 may be left unattached at the manufacturing location. Horizontal wall braces 112, vertical wall braces 114, and track support bars 122 will preferably interconnected with each adjacent component using pintles, such as pins or other suitable equivalent. In addition, diagonal wall braces 116 and diagonal track support bars 124 may be provided with pins, allowing the entire side-wall structure to be unfolded to form a straight and linked assembled. In such instance, other potentially interfering components such as optional track support bars 120 will either be similarly pintle-attached or fastener-removable. These three shipping embodiments are presented as exemplary and illustrative, but are not limiting to the many possible configurations that may be used for packaging and shipping of the present invention.

While aeration units are the focus of the present invention, preferred embodiment universal bridge and wall mounted aeration unit 100 may also be used with other units that operate in the same conditions as aeration units, such as mixers and related apparatus.

From the foregoing figures and description, several additional features and options become more apparent. Many aeration units may be arranged in a single holding space to work concurrently and possibly compound the effect of each aeration unit 160. Furthermore, the angles and orientations of each aeration unit 160 may readily be adjusted for optimum flow within a containment tank or pond. The preferred universal bridge and wall mounted aeration unit 100 may be manufactured from a variety of materials, including metals, resins and plastics, ceramics or cementitious materials, or even laminations, combinations or composites of the above. Nevertheless, for most applications metals may be preferable given the high forces, and the metals will preferably be either intrinsically corrosion resistant, such as is the case with aluminum and stainless steel, or may be galvanized or otherwise coated or plated to obtain necessary corrosion resistance.

Various additional preferred embodiments of apparatus designed in accord with the present invention have been illustrated in FIGS. 5-8. These second and third preferred embodiments are distinguished by the hundreds digit, and various components within each embodiment designated by the ones and tens digits. However, many of the components are alike or similar between embodiments, so numbering of the ones and tens digits have been maintained wherever possible, such that identical, like or similar functions may more readily be identified between the embodiments. Where no numbering has been provided, it will be understood that these components are identical or have like or similar function. If not otherwise expressed, those skilled in the art will readily recognize the similarities and understand that in many cases like numbered ones and tens digit components may be substituted from one embodiment to another in accord with the present teachings, except where such substitution would otherwise destroy operation of the embodiment. Consequently, those skilled in the art will readily determine the function and operation of many of the components illustrated herein without unnecessary additional description.

Figure 5:
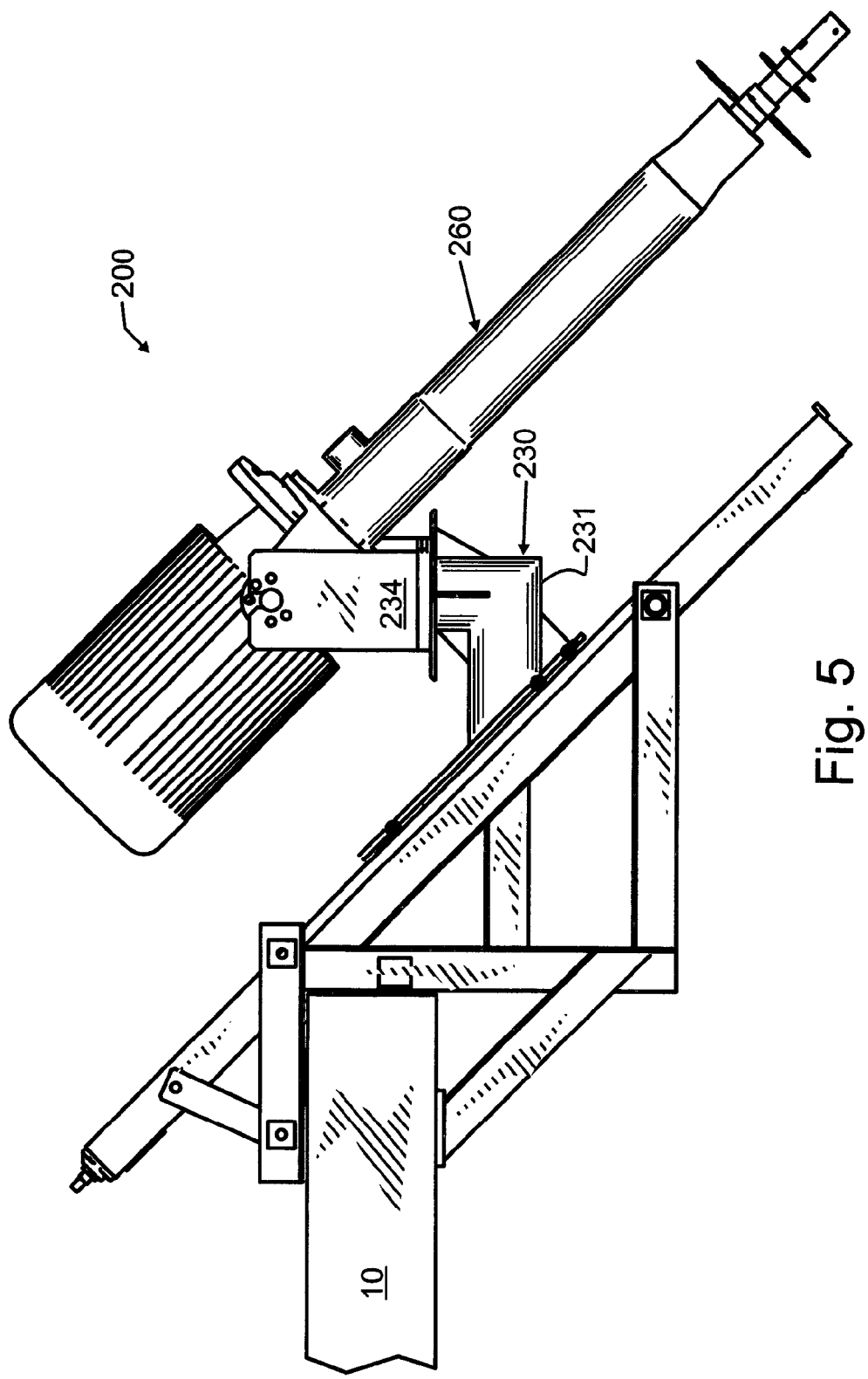
FIG. 5 illustrates a second preferred embodiment universal bridge and wall mounted aeration apparatus from a side elevational view and coupled to a bridge structure.
Figure 7:
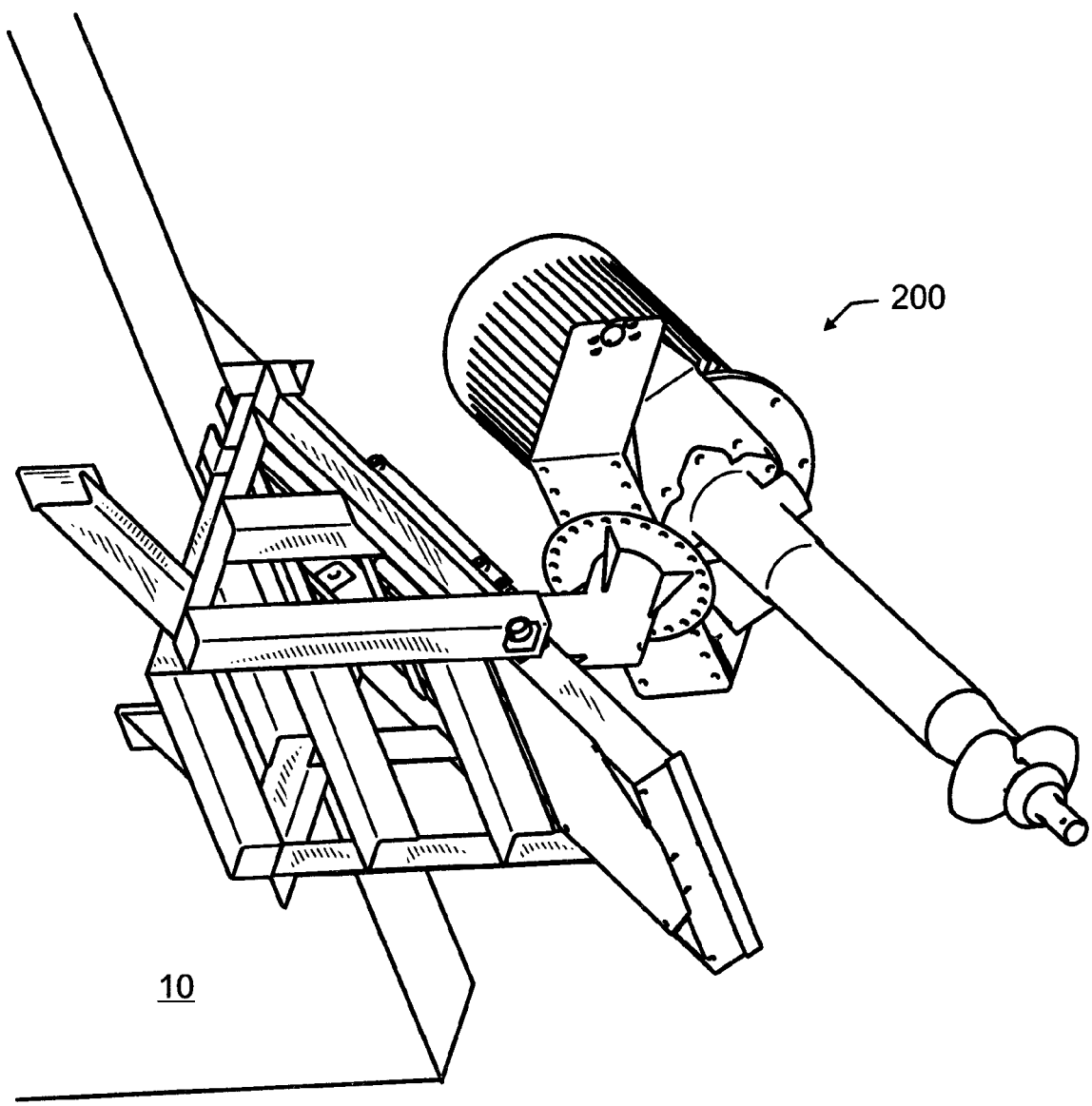
FIG. 7 illustrates the second preferred embodiment universal bridge and wall mounted aeration apparatus of FIG. 5 from a lower perspective view.
Figure 8:
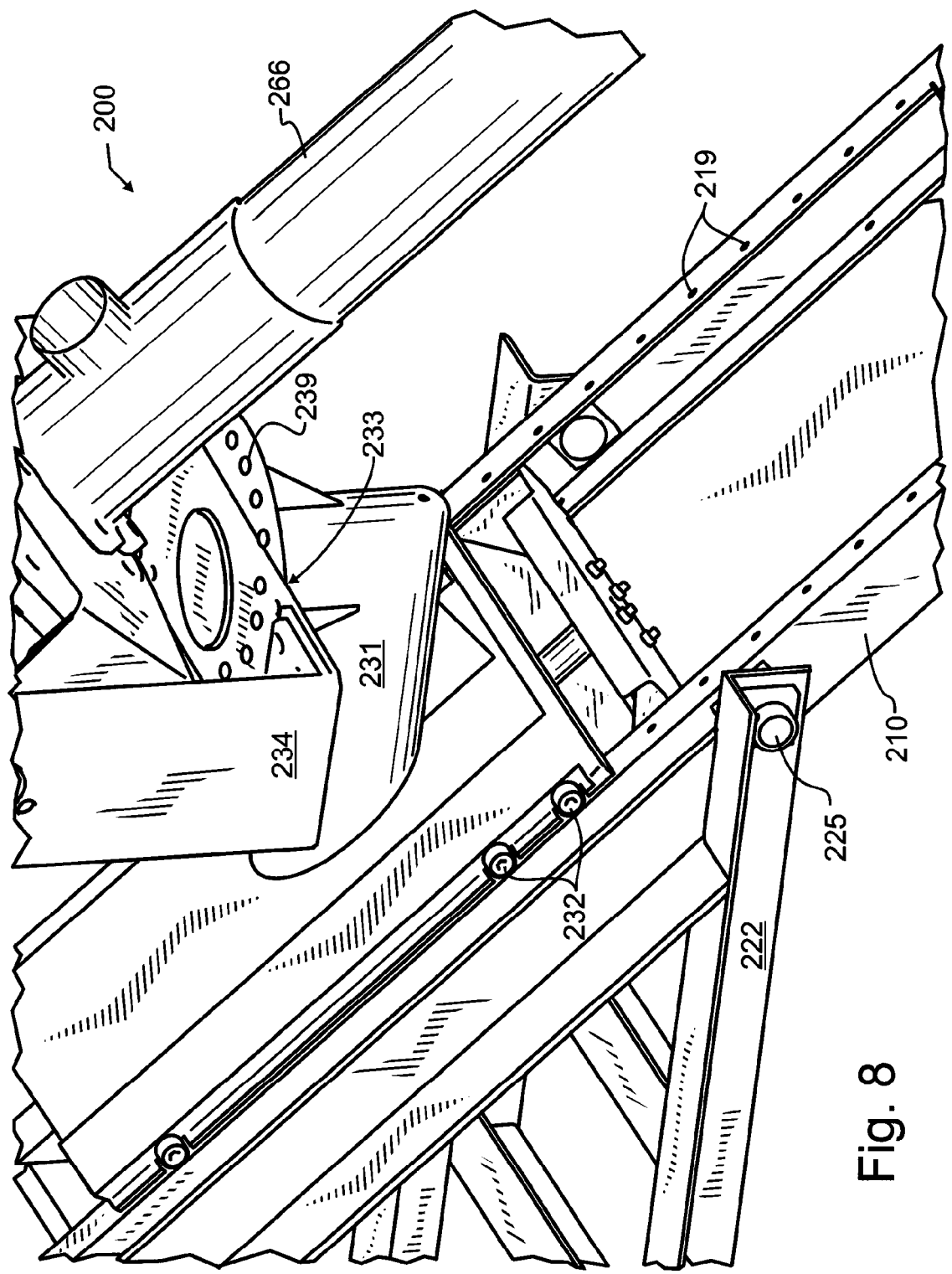
FIG. 8 illustrates the second preferred embodiment universal bridge and wall mounted aeration apparatus from a top perspective view, showing the pedestal and track in greater detail.

Second preferred embodiment universal bridge and wall mounted aeration apparatus 200 is illustrated in FIG. 5 from a side elevational view coupled to a bridge structure, similar to and easily contrasted with the view of FIG. 1. FIG. 7 illustrates the second preferred embodiment universal bridge and wall mounted aeration apparatus 200 of FIG. 5 from a lower perspective view, and FIG. 8 illustrates the second preferred embodiment universal bridge and wall mounted aeration apparatus 200 from a top perspective view, showing the pedestal and track in greater detail. In this second preferred embodiment universal bridge and wall mounted aeration apparatus 200, pedestal 230 has a compound pedestal column 231 that extends both horizontally and vertically. In addition, outer U-bracket 234 has a slightly different geometry to accommodate slightly different aeration unit 260. While similar to the pedestal top coupler 133, pedestal top coupler 233 visible in FIG. 8 also clearly shows one preferred implementation of this coupler using available locating holes 239 through which fasteners such as bolts, pins or other equivalent structures may pass to set and hold the orientation of outer U-brackets 234 and aeration unit 260 about a vertical axis of rotation.

Figure 6:
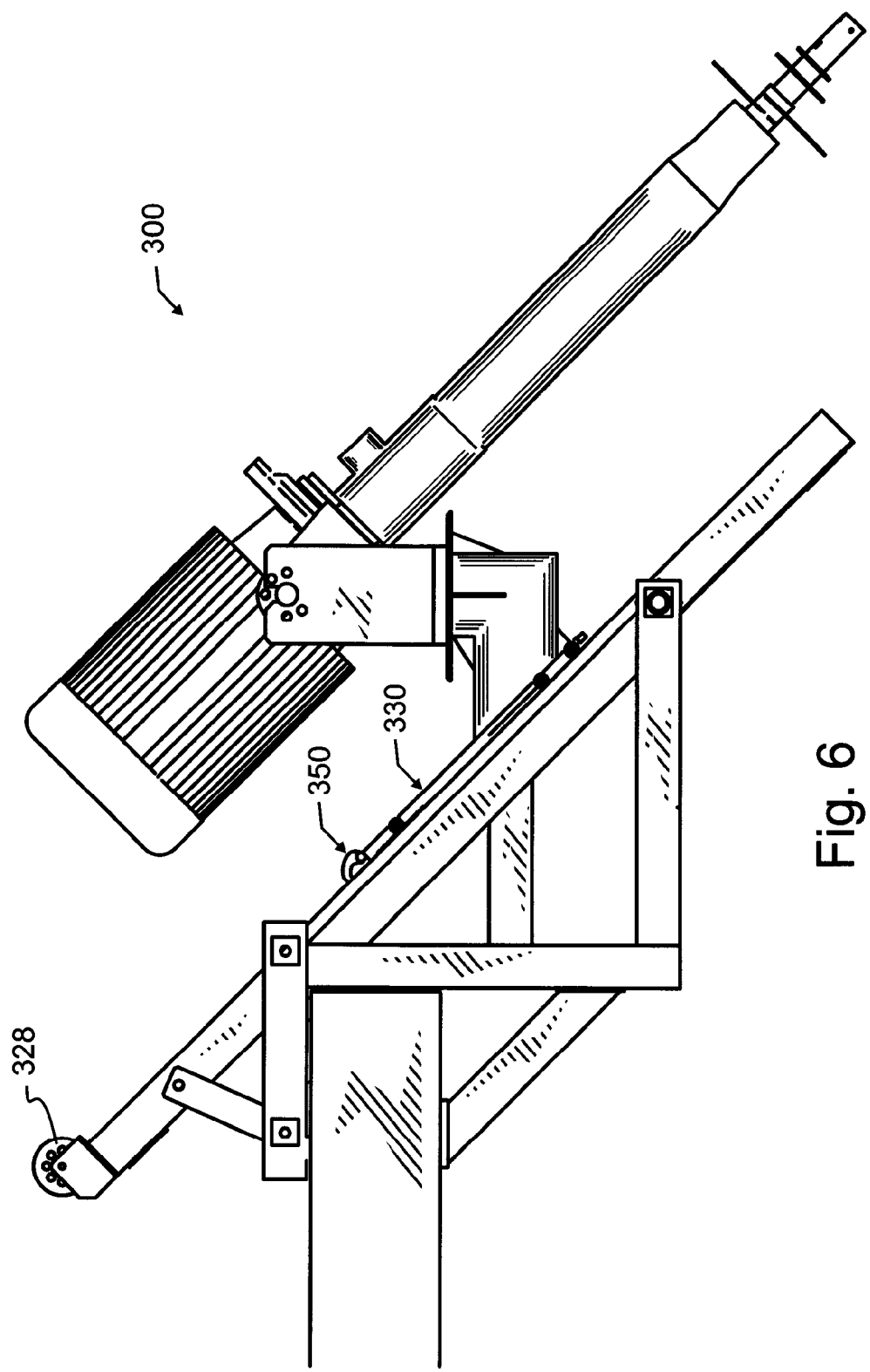
FIG. 6 illustrates a third preferred embodiment universal bridge and wall mounted aeration apparatus from a side elevational view and coupled to a bridge structure.

A third preferred embodiment universal bridge and wall mounted aeration apparatus 300 is illustrated in FIG. 6 from a side elevational view coupled to a bridge structure, similar to and easily contrasted with the views of FIGS. 1 and 5. In this second preferred embodiment universal bridge and wall mounted aeration apparatus 300, the selective mover comprises a cable actuation point 328, which may be used to wind and unwind a cable that may be used to raise and lower platform and pedestal 130 along track 110, as an alternative to jackscrew 126 and jackscrew actuation point 128. In a yet further alternative embodiment, a cable from a separate or free-standing selective mover, such as a davit, other crane or or other equivalent device, may be guided by cable actuation point 328 and coupled with platform 330. An optional safety catch 350 may be provided, which acts as a pawl or ratchet mechanism similar to that found in jacks and roller coasters to prevent platform 330 from dropping suddenly if the cable breaks or becomes unintentionally disconnected. Safety catch 350 may for exemplary and non-limiting purposes couple to any beam or ladder support or other structure extending across or within the center of track 110, or any other structure or apparatus that may be provided therefor.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

We claim:

1. In combination, a wall and bridge mount, a track extending between two distinct elevations and coupled to said wall and bridge mount, an aeration unit pivotally coupled to said track and having an aerator configured to operatively at least partially submerge within and aerate a liquid, and a drive configured to operatively move said aeration unit along said track and thereby vary an elevation of said aeration unit, said wall and bridge mount having:
at least one horizontal wall brace configured to affix upon the top surface of a stationary structure;
at least one vertical wall brace rigidly affixed to said at least one horizontal wall brace and that extends down therefrom, said at least one vertical wall brace configured to affix upon the vertical side of a stationary structure;
at least one lower track support bar extending horizontally from adjacent a lower end of said at least one vertical wall brace;
said track extending from said at least one lower track support bar adjacent an end of said at least one lower track support bar distal to said at least one vertical wall brace lower end and passing through a vertical plane defined by said vertical side of said stationary structure.

2. The combination wall and bridge mount, track, aeration unit, and drive of claim 1, wherein said track is sloped at an angle between horizontal and vertical.

3. The combination wall and bridge mount, track, aeration unit, and drive of claim 2, wherein said aeration unit is pivotal with respect to said track about two distinct axes.

4. The combination wall and bridge mount, track, aeration unit, and drive of claim 3, wherein said aeration unit two distinct pivotal axes are orthogonal with respect to each other.

5. The combination wall and bridge mount, track, aeration unit, and drive of claim 4, wherein said aeration unit two distinct pivotal axes and said movement of said aeration unit along said track define three axes of motion.

6. The combination wall and bridge mount, track, aeration unit, and drive of claim 1, wherein said aeration unit further comprises a motor, said aerator driven by said motor.

7. The combination wall and bridge mount, track, aeration unit, and drive of claim 6, wherein said aerator further comprises:
a shaft that couples said motor to a propeller, said propeller driven by said motor;
a gas inlet; and
a gas outlet configured to be submerged within said liquid when said aerator is operatively at least partially submerged and aerating a liquid.

8. The combination wall and bridge mount, track, aeration unit, and drive of claim 1, wherein said drive further comprises a jack screw.

9. The combination wall and bridge mount, track, aeration unit, and drive of claim 1, wherein said stationary structure comprises a wall.

10. The combination wall and bridge mount, track, aeration unit, and drive of claim 1, wherein said stationary structure comprises a bridge.

11. The combination wall and bridge mount, track, aeration unit, and drive of claim 1, further comprising at least one upper track support bar extending vertically up from said at least one horizontal wall brace, said track rotatable with respect to and affixed adjacent a first end to said at least one lower track support bar and said track rotatable with respect to and affixed adjacent a second end distal to said track first end to said upper track support bar.

12. The combination wall and bridge mount, track, aeration unit, and drive of claim 1, further comprising a pedestal pivotally coupling to said aeration unit and resting on said track.

13. The combination wall and bridge mount, track, aeration unit, and drive of claim 12, further comprising:
a first bracket affixed to said pedestal and rotatable about a vertical axis with respect thereto;
a second bracket rotatably affixed to said first bracket about a horizontal axis and supporting said aeration unit thereupon.

14. The combination wall and bridge mount, track, aeration unit, and drive of claim 1, wherein said drive further comprises a davit.

\* \* \* \* \*